No. 872,908. PATENTED DEC. 3, 1907.
C. H. FOSTER.
SHOCK ABSORBING DEVICE FOR VEHICLES.
APPLICATION FILED DEC. 14, 1905.

Witnesses:
F. H. Swabb
B. W. Brockett

Inventor:
Claud H. Foster,
By Fouts & Hull,
His Attorneys.

UNITED STATES PATENT OFFICE.

CLAUD H. FOSTER, OF CLEVELAND, OHIO.

SHOCK-ABSORBING DEVICE FOR VEHICLES.

No. 872,808.   Specification of Letters Patent.   Patented Dec. 3, 1907.

Application filed December 14, 1905. Serial No. 291,704.

To all whom it may concern:

Be it known that I, CLAUD H. FOSTER, residing at Cleveland, in the county of Cuyahoga and State of Ohio, have invented a certain new and useful Improvement in Shock-Absorbing Devices for Vehicles, of which the following is a full, clear, and exact description, reference being had to the accompanying drawings.

My invention relates to means for absorbing shocks given to vehicles and for relieving the springs of vehicles from such shocks with a view to prevent breakage and to prolong the life of the same and secure ease of riding.

It consists generally in the combination, with a vehicle body, of a dashpot so constructed as to permit the body of the vehicle to descend freely and with comparatively slight obstruction but to check the return movement of the same, thereby avoiding the breaking of the vehicle spring or springs at the time when the greatest liability of such breakage occurs.

The invention further consists in providing simple and effective means whereby the dashpot may be rigidly secured in position and the twisting and binding of the piston within the cylinder and of the piston rod in its stuffing box is prevented, notwithstanding the swaying of the vehicle body and of the movements of the body and axle relatively to each other and longitudinally of the body.

Generally speaking, the invention may be defined as consisting of the combinations of elements embodied in the claims hereto annexed.

Figure 1:
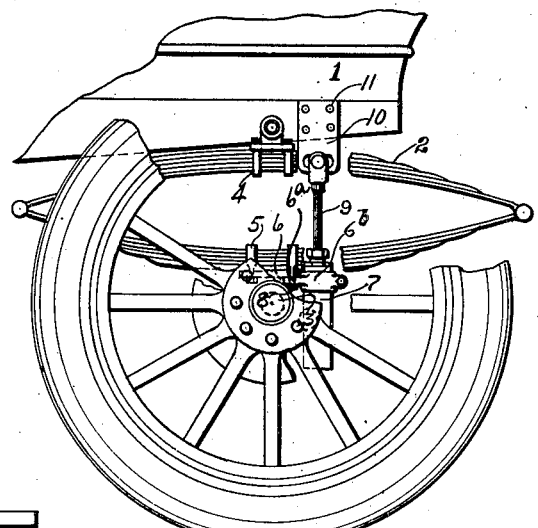
Figure 3:
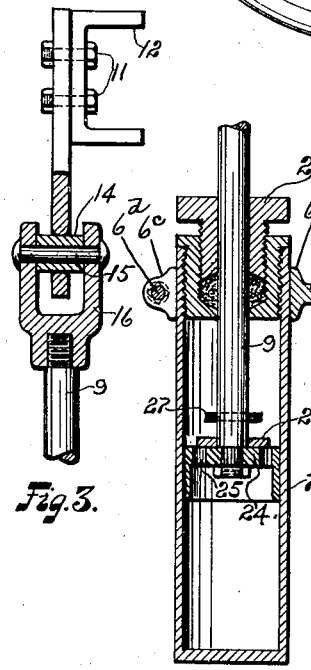
Figures 4, 5:
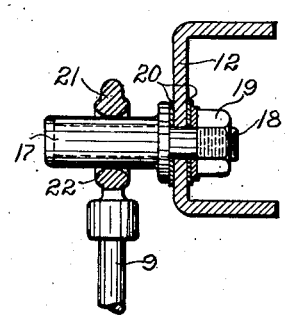
Figure 2:
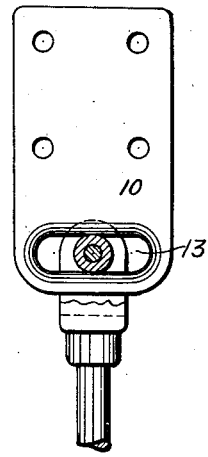
Figure 6:
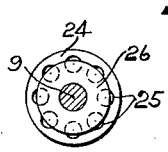

In the drawings:—Figure 1 represents a side elevation, with parts broken away, of my invention, showing so much of the rear portion of a vehicle as is necessary to illustrate its mode of application thereto; Figs. 2 and 3 represent enlarged details showing the manner of connecting the piston rod to the vehicle frame; Fig. 4 represents a sectional detail of a modification of the connecting means shown in the preceding figure; Fig. 5 represents a vertical sectional view through the dashpot; and Fig. 6 represents a top plan view of the piston and valve.

In the drawings, 1 represents the body of a vehicle, for instance an automobile, 2 represents the rear spring of said vehicle, and 3 the end of the axle. The spring is secured in place by means of the usual clips 4 and 5, the lower ends of the clips 5 being threaded and extending through a plate 6 which may be carried by the axle. The threaded portions of one of the clips 5, as the rear clip, are elongated to extend through the plate $6^a$, which is adjustably fitted to the cylinder 7 of a dashpot, as by a collar $6^b$ having lugs $6^c$ through which extends a bolt $6^d$, thereby providing a simple and effective means for rigidly supporting said cylinder from the axle. The lower extremities of the clips are provided with the usual nuts 8.

As a means for connecting the piston rod 9 of the dashpot with the vehicle body, I provide a plate 10, which may be secured to the lower side portion of said body, as by means of bolts 11. In the case of an automobile as commonly constructed, these bolts will extend through the channel beam 12 at the base of the body. At its lower end, this plate is provided with an elongated slot 13. As will appear more particularly from Fig. 3, the upper and lower walls of this slot are convex or rounded in outline from the center of the slot to the exterior thereof. The piston rod 9 is connected to this plate by means of a roller 14 carried by a bolt or rivet 15, which is supported between the jaws of a yoke 16 carried by the upper end of said piston rod. The roller is of a diameter to be inserted easily into the slot and form a suitable bearing with the central portions of the top and bottom walls thereof. By this arrangement, it will be apparent that the length of the slot will accommodate the longitudinal movement of the axle relatively to the body and vice versa and that the rounding of the top and bottom walls of the slot will accommodate the twisting or lateral tilting of the body without danger of breaking the piston rod or causing the binding of the piston against the cylinder or of the rod against the walls of the stuffing box.

Where springs of less height than are shown in the drawing are employed, as in the case of half springs, or where the space between the springs and the outside of the body is sufficiently wide, I may dispense with the plate 10 and provide a shorter connection between the piston rod and the vehicle body. In this case, a roller 17 may be provided, said roller being mounted on a pin 18 extending through the channel beam and being secured thereto, as by a nut 19 and washers 20. In this case, the upper end of the piston rod 9 has applied thereto a plate 21 provided with a slot 22 which is similar to the slot 13 on the plate 10.

The dashpot which I employ is adapted to permit of the comparatively unobstructed movement of the body and axle toward each other, but to resist a movement tending to separate the same. A great majority of breakages of springs occurs on the movement tending to separate the axle and body after a sudden movement in the opposite direction. As I propose to employ liquid in the dashpot, a stuffing box 23 is provided for the piston rod, said stuffing box being of any desired construction. The piston rod is provided at its lower end with a piston 24. This piston is preferably of the trunk type and fits closely within the cylinder to prevent tilting of the rod, and is provided with a suitable number of ports or perforations 25 extending therethrough, the area of said ports being sufficient to enable the piston to respond freely to a movement of the vehicle body and axle toward each other. To retard the reverse movement of these parts, I provide a valve 26, which is preferably in the shape of a washer mounted on the piston rod and resting on the top of the piston and nearly covering the ports 25. To hold the valve or washer in operative relation to the ports on the upward movement of the body, a pin 27 is provided on the rod 9, said pin being spaced a short distance from the piston and adapted to engage the washer and prevent undue separation between the same and the upper face of the piston. As will appear from Figs. 5 and 6, the valve 26 nearly covers the ports 25, leaving a very small area thereof uncovered, thereby permitting a gradual movement of the piston in an upward direction but preventing a quick movement of the same in such direction. This prevents a quick movement in a direction to separate the body and axle and protects the springs against breakage. With heavy springs a greater area of the ports will be covered than in the case of lighter springs. One or two dashpots may be provided for each axle, if desirable or necessary.

By the construction described, I have produced a very simple and effective means for absorbing the shocks given to a vehicle and for reducing to a minimum the vibrations of the parts, with attendant saving in the breakage of the springs, as well as securing ease of riding.

While I have necessarily described in detail the embodiment of my invention herein disclosed, it will be apparent that such details may be departed from more or less without avoiding the spirit of my invention, and I do not propose to be limited to such details except as such limitations may be rendered necessary by the prior state of the art or may be positively included in the claims hereto annexed.

Having thus described my invention what I claim as new and desire to secure by Letters-Patent is:—

1. The combination, with the body and axle of a vehicle, of a dashpot comprising a cylinder supported by the axle and a piston therein, a rod for said piston having at its upper end a bracket, a pin carried by said bracket and a plate or member carried by said body and provided with a slot for the reception of said pin, said slot being elongated longitudinally of the vehicle, substantially as specified.

2. The combination, with the body and axle of a vehicle, of a dashpot comprising a cylinder and a piston, a rod for said piston, a pin carried by the upper end of said rod, a plate or member carried by said body and having an elongated slot for said pin, and a collar surrounding said cylinder and having an extension adapted to be operatively secured to said axle, substantially as specified.

3. The combination, with a vehicle body and axle, of a dash pot comprising a piston connected to one of the aforesaid vehicle members and a cylinder supported by the other member, a piston rod for said piston, said piston having a circular series of perforations arranged concentrically with respect to said piston rod with their outer portions substantially equidistant from said rod, a circular disk on said piston and being of a diameter to extend nearly to the outer portions of said perforations, said disk having an opening therethrough to permit of its application to the piston rod, and a stop on said rod, substantially as specified.

4. The combination, with a vehicle body and axle, of a dashpot comprising a piston connected to one of the aforesaid vehicle members and a cylinder supported by the other member, said piston having a plurality of perforations therethrough, a valve consisting of a disk resting on one face of said piston and adapted to nearly cover the perforated area of the piston, said valve having an opening therethrough to permit of its application to the piston rod, and a stop on said piston rod to limit the separation of the piston and said valve, substantially as specified.

5. The combination, with the body and an axle of a vehicle, of a dashpot comprising a cylinder supported by one of the aforesaid vehicle members, a piston in said cylinder, a piston rod for said piston connected with the other vehicle member, such connection comprising a roller projecting through an elongated slot, substantially as specified.

6. The combination, with the body and an axle of a vehicle, of a dashpot interposed between the body and axle, said dashpot comprising a cylinder supported by the axle, a piston in said cylinder, a piston rod for said piston, and means for connecting the upper end of said rod with said body, said means comprising a roller and an elongated slot, the opposite walls of said slot being rounded, substantially as specified.

7. The combination, with the body and an axle of a vehicle, of a dashpot interposed between said body and axle and comprising a cylinder and a piston, means for compensating for the tilting movements of the aforesaid vehicle members with respect to each other, said means comprising a pin extending into a slot, said slot having the top and bottom walls thereof rounded, substantially as specified.

8. The combination, with the body and an axle of a vehicle, of a dashpot interposed between said body and axle and comprising a cylinder and a piston, means for compensating for the tilting movements of the aforesaid vehicle members with respect to each other, said means comprising a pin or shaft, and a roller mounted on said pin or shaft and extending into a slot the top and bottom walls of which are rounded, substantially as specified.

9. The combination, with the body and an axle of a vehicle, of a dashpot interposed between said body and axle, said dashpot comprising a cylinder supported by the axle, a piston within the cylinder, a piston rod for said piston, a slotted member carried by the vehicle body, the slot being provided with rounded walls, and a pin carried by said piston rod and adapted to fit within said slot, substantially as specified.

10. The combination, with the body and an axle of a vehicle, of a dashpot interposed between said body and axle, said dashpot comprising a cylinder supported by said axle, a piston in said cylinder, a rod for said piston having at its upper end a bracket, a pin carried by said bracket, a roller on said pin, and a slotted member carried by said body, the slot being elongated longitudinally of the vehicle and of a vertical depth to accommodate said roller, substantially as specified.

11. The combination, with the body and axle of a vehicle, of a dashpot interposed between said body and axle, said dashpot comprising a cylinder supported by said axle, a piston in said cylinder, a piston rod for said piston, a yoke carried by the upper end of said piston rod, a pin extending between the arms of said yoke, a roller on said pin, a member carried by the body, said member having therein a slot for the roller which is elongated lengthwise of the body and whose upper and lower walls are rounded, substantially as specified.

In testimony whereof I affix my signature in the presence of two witnesses.

CLAUD H. FOSTER.

Witnesses:
   J. B. HULL,
   B. W. BROCKETT.